(12) United States Patent
Fabian et al.

(10) Patent No.: US 6,809,139 B2
(45) Date of Patent: Oct. 26, 2004

(54) PARTICULATE SEALANT FOR FILTER PLUG FORMING

(75) Inventors: Michelle D. Fabian, Horseheads, NY (US); Shahid G. Lakhwani, Painted Post, NY (US); Mia K. Roberts, Corning, NY (US)

(73) Assignee: Corning Incorporated, Corning, NY (US)

( * ) Notice: Subject to any disclaimer, the term of this patent is extended or adjusted under 35 U.S.C. 154(b) by 104 days.

(21) Appl. No.: 10/087,043

(22) Filed: Feb. 28, 2002

(65) Prior Publication Data

US 2003/0162883 A1 Aug. 28, 2003

(51) Int. Cl.[7] .............................................. C04B 35/04
(52) U.S. Cl. ...................... 524/430; 501/119; 264/631; 264/42; 264/43; 264/44
(58) Field of Search ................................ 524/451, 430, 524/492, 493, 441, 436, 447, 495, 478, 487, 488, 489

(56) References Cited

U.S. PATENT DOCUMENTS

| | | |
|---|---|---|
| 3,790,654 A | 2/1974 | Bagley |
| 3,919,384 A | 11/1975 | Cantaloupe et al. |
| 4,297,140 A | 10/1981 | Paisley |
| 4,432,918 A | 2/1984 | Paisley |
| 5,021,204 A | 6/1991 | Frost et al. |
| 5,043,369 A | 8/1991 | Bahn et al. |
| 5,258,150 A | 11/1993 | Merkel et al. |
| 5,392,982 A | 2/1995 | Li |
| 5,602,197 A * | 2/1997 | Johnson et al. ............. 524/275 |
| 5,746,253 A | 5/1998 | Dust et al. |
| 5,766,393 A * | 6/1998 | Nishimura et al. ...... 156/89.22 |
| 5,938,992 A * | 8/1999 | Hamanaka et al. ........... 264/43 |
| 6,287,996 B1 | 9/2001 | Chiba et al. |

\* cited by examiner

Primary Examiner—Katarzyna Wyrozebski
(74) Attorney, Agent, or Firm—Anca C. Gheorghiu

(57) ABSTRACT

A particulate sealant for forming plugs in selected cells of honeycomb structures and consisting essentially, by weight, of about 70 to 90% ceramic blend, the ceramic blend being raw ceramic materials selected to form a composition consisting essentially of in percent by weight about 12 to 16% MgO, about 33 to 38% $Al_2O_3$, and about 49 to 54% $SiO_2$, which will form cordierite ($2MgO.2Al_2O_3.5SiO_2$) on firing, and about 10 to 30% binder system comprising a thermoplastic polymer capable of forming a gel or a thermosetting resin.

15 Claims, 2 Drawing Sheets

PARTICULATE SEALANT FOR FILTER PLUG FORMING

BACKGROUND OF INVENTION

The present invention relates to a particulate sealant for forming plugs in selected cells of honeycomb structures for employment in diesel exhaust filtration. In particular the present invention relates to a non-aqueous powdered material comprising a ceramic blend and an organic binder system.

It is well known that a solid particulate filter body, such as a diesel particulate filter, may be formed of a structure comprising a matrix of intersecting, thin, porous walls which extend across and between two of its opposing end faces and form a large number of adjoining hollow passages or cells which also extend between and are open at the end faces of the structure. To form a filter, one end of each of the cells is closed, a first subset of cells being closed at one end face and the remaining cells being closed at the remaining opposing end face of the structure. Either of the end faces may be used as the inlet face of the resulting filter. The contaminated fluid is brought under pressure to the inlet face and enters the body via those cells which have an open end at the inlet face. Because these cells are closed at the outlet end face of the body, the contaminated fluid is forced through the thin, porous walls into adjoining cells which are sealed at the inlet face and open at the outlet face of the filter body. The solid particulate contaminant in the fluid which is too large to pass through the porous openings in the walls is left behind and a cleansed fluid exits the filter body through the outlet cell channels, for use.

Up to this time selected cells were sealed or plugged with a foam-type cement, as disclosed in U.S. Pat. No. 4,297,140. The cement is formed into a paste by mixing ceramic raw material with an aqueous binder, such as methyl cellulose, plasticizer and water. When using this foam-type cement, both ends of the honeycomb structure are covered with flexible masks having holes through which the cement is pushed into the ends of the cells. There are numerous disadvantages associated with this type of filling or plugging material. The masks must be cleaned and dried after each use. Unclean masks can cause missing plugs requiring additional manual labor. The cement batch is time, shear and temperature dependent; often thrown out, unused due to age restrictions; and, drying is required to remove the water content.

It would be desirable to obtain a nonaqueous sealant for forming plugs in honeycomb cells, which avoids the aforementioned disadvantages.

SUMMARY OF INVENTION

It has now been discovered that a material capable of forming plugs in selected cells of a honeycomb structure can be made from a mixture comprising a ceramic blend of controlled composition and a binder system. The inventive material can be generally characterized as a non-aqueous particulate sealant. By "non-aqueous" is meant that a water phase is absent from the composition. By "particulate" is meant a material in powder form.

The composition of the sealant material according to the present invention consists essentially, by weight, of about 70–90% ceramic blend, and about 10–30% non-aqueous binder, preferably about 78–84% ceramic blend, and about 16–22% binder. The ceramic blend is a mixture of ceramic raw ceramic materials which are selected to form a composition of MgO, $Al_2O_3$, and $SiO_2$ that will yield on firing cordierite having a stoichiometry approximating $Mg_2Al_4Si_5O_{18}$, as disclosed in U.S. Pat. No. 5,258,150 assigned to the present assignee, and herein incorporated by reference in its entirety. The composition preferably consists essentially of, in percent by weight of about 12 to 16% MgO, about 33 to 38% $Al_2O_3$, and about 49 to 54% $SiO_2$. The most preferred composition consists essentially of in percent by weight about 12.5 to 15.5% MgO, 33.5 to 37.5% $Al_2O_3$, and 49.5 to 53.5 $SiO_2$. The actual raw materials for the MgO, $Al_2O_3$, and $SiO_2$ composition components are talc having a BET surface area of no greater than about 5 $m^2/g$, and preferably no greater than about 3 $m^2/g$, clay, such as platelet or stacked clay, an aluminum oxide yielding component having an average particle size of about 3 to 8 micrometers, and free silica. A pore former or burnout agent may be optionally included in the ceramic batch. Suitable pore formers include for example graphite, cellulose, flour and the like.

The binder system has to be compatible with a very high ceramics loading (i.e., 80–90% by weight). Accordingly, a suitable binder system comprises a thermoplastic polymer capable of forming a reversible gel as taught in U.S. Pat. No. 5,602,197, co-assigned to the present assignee and herein incorporated by reference in its entirety. Specifically, in the present invention, the binder system is composed of a high molecular weight thermoplastic polymer serving as a gel-forming species, a wax serving as the solvent for the thermoplastic polymer, the wax having a low melting point, and being selected from fatty alcohol, fatty acid, fatty glycol, and fatty glyceride waxes, and optionally a dispersant serving as a functional additive. Preferred high molecular thermoplastic polymers are a tri-block styrene-ethylene/butylene-styrene copolymer or a butyl methacrylate/acrylic acid copolymer. The tri-block styrene-ethylene/butylene-styrene copolymer is commercially available under the trade-name Kraton® available from Kraton Polymer Company of Houston, Tex. The butyl methacrylate/acrylic acid copolymer is commercially available under the trade-name as Neocrylo® available from NeoResins of Wilmington, Mass. The use of appropriate dispersants allows for very high inorganic solids loadings, which loadings would be difficult to achieve without the use of any dispersants in the binder system. Also added dispersants can have a substantial effect on the rheology. In the present invention a suitable dispersant is commercially available under the trade name Solsperse® available from Avecia of Charlotte, N.C. The particularly preferred binder system has a formulation consisting essentially, in weight percent, of about 5–20% wax, 1–7% high molecular weight thermoplastic polymer, and 0–5% dispersant A more preferred formulation consists essentially, in weight percent, of about 9.8–10.0% wax, 4.9–5.0% high molecular weight thermoplastic polymer, and 1.7% dispersant.

Alternatively, the binder system comprises a solid grade thermosetting resin. See U.S. Pat. No. 5,043,369. Unlike thermoplastic polymers which on heating soften and flow, and on cooling re-solidify, thermosetting resins have chains that are linked in a 3-D network and cannot be melted, often getting stiffer with heating. Representative thermosetting resins suitable in the present invention include epoxy resins, phenolics, diallyl phthalates, unsaturated polyesters and functionalized acrylics. Unlike prior art batches for ceramic forming, which considered residual carbon, from a thermosetting resin, remaining after binder removal, to be detrimental to the development of desirable ceramic microstructure in the final product, the sealant material of the present invention is not so sensitive to residual carbon remaining after debinding. Since the sealant material is used to form plugs in diesel particulate filters, the porosity that would be produced by residual carbon would not be harmful. A preferred binder system formulation comprising a thermosetting resin consists essentially of in percent by weight about 20–30% thermosetting resin, and 0–2% dispersant. A preferred thermosetting rein is epoxy resin such as Epon® available commercially from Resolution Performance Products of Houston, Tex. Optionally the binder system could include a crosslinking agent as known in the art, such as polyamines, phenolics, amino resin or dibasic acid.

In the process of making the inventive sealant, the preferred method comprises preparing an intimate mixture of the ceramic blend and the binder through high shear dispersive mixing according to the teachings of U.S. Pat. No. 5,043,369, co-assigned to the present assignee and herein incorporated by reference in its entirety. First the ceramic raw materials are pre-mixed to form a homogeneous ceramic blend. Thereafter, the ceramic blend is dry mixed with the wax, polymer, and dispersant in accordance with conventional procedures. The resulting batch is fed into a twin screw extruder which can be programmed to operate at temperatures between about 30°–140° C.; temperatures at which the binder fluidizes and very fine melt mixing can occur to form a homogeneous paste. Thereafter, the so-mixed material is extruded in a spaghetti-like form, cooled and granulated for later use as a sealant.

Alternatively the inventive sealant material may be compounded according to the teachings of U.S. Pat. No. 5,602,197, by simply combining the selected ceramic powder material with premixed binder in accordance with conventional procedures for using hot melt binders. In one embodiment the ceramic blend is first combined with the dispersant component and a solvent for the dispersant to provide a powder slurry. In a separate container and separate mixing step, the thermoplastic polymer selected for incorporation in the binder is combined with a selected low-melting wax component at a temperature above the melting point of the wax, in order to provide a wax/polymer mixture comprising a uniform solution or dispersion of the polymer in the molten wax. The powder slurry is next combined with the wax/polymer mixture and the combination is mixed together at a temperature above the melting temperature of the wax. Mixing is continued for a time at least sufficient to provide a homogeneous dispersion of the powder in the binder, and will be sufficient to evaporate the solvent component from the mixture. Thereafter, the batch is removed, cooled, and granulated for later use in plugging honeycomb cells.

Alternatively, individual, spherical granules comprising the sealant may be formed by art known spray drying techniques, from a well dispersed slurry source containing the ceramic blend and the polymeric binder system.

Regardless of forming methods however, the sealant is formed into powder form having a mean particle size of between about 5 and 500 micrometers, preferably 25–250 micrometers, a range of size which allows for good flowing and packing capabilities.

DETAILED DESCRIPTION OF PREFERRED EMBODIMENTS

Figure 1:
FIGS. 1–2 are scanning electron micrographs illustrating a prior art plugged honeycomb cell in and a honeycomb cell plugged with the sealant of the present invention.

A series of samples comprising particulate sealant according to this invention were prepared using the batch materials as shown in Table I. The binder included a high molecular weight thermoplastic, selected from the group consisting of a Kraton styrene-ethylene/butylene-styrene copolymer, and a Neocryl® acrylic acid functional butyl. The wax consists of a fatty alcohol with a long chain primary alcohol. It was chosen because it provides a clean burn out by volatilization at relatively low temperatures of about 80° C. Dispersant was optionally included.

TABLE I

Batch Compositions - weight % of total ceramic materials

| Example | 1 | 2 | 3 | 4 | 5 | 6 |
|---|---|---|---|---|---|---|
| PPB# | 15 | 9 | 10 | 16 | 17 | 18 |
| Ceramic blend | 83.6 | 80.0 | 85.0 | 78.6 | 83.6 | 78.6 |
| Alfol ® 1418DDB wax | 9.8 | 13.3 | 10.0 | 14.8 | 9.8 | 14.8 |
| Kraton ® G1652 polymer | 4.9 | 0 | 0 | 4.9 | 0 | 0 |
| Kraton ® G1650 polymer | 0 | 6.7 | 5.0 | 0 | 0 | 0 |
| Neocryl ® B723 polymer | 0 | 0 | 0 | 0 | 4.9 | 4.9 |
| Solsperse ® 9000 dispersant | 1.7 | 0 | 0 | 1.7 | 1.7 | 1.7 |
| Inorganic/organic weight ratio | 5 | 4 | 5.7 | 3.7 | 5 | 3.7 |

The ceramic blend is a mixture of cordierite-forming raw materials, specifically clay, talc, alumina and silica, forming a preferred composition as provided in Table II. A burnout agent or a pore former, e.g., graphite, was included in the compositional batch. The percent weight of MgO, $Al_2O_3$, and $SiO_2$ are also provided.

TABLE II

Ceramic blend raw materials and composition.

| Raw Materials | Weight % |
|---|---|
| Talc | 40.7 |
| Silica | 12.5 |
| Aluminum Hydroxide | 16.0 |
| Alumina | 14.8 |
| Kaolin | 16.0 |
| Graphite | 10.0 |
| Weight % MgO | 14.1 |
| Weight % $Al_2O_3$ | 35.6 |
| Weight % $SiO_2$ | 50.3 |

In process the ceramic raw materials are first pre-milled in a ball mill jar to form a blend. Thereafter, the ceramic blend is dry mixed with the wax, thermoplastic, and dispersant in accordance with conventional procedures. The resulting batch is fed into the barrel of a twin screw extruder which can be programmed to operate at temperatures between about 30°–140° C. The extruder has the capability of providing a temperature profile along the length of the barrel thereof. To illustrate, typical extrusion conditions for the illustrative examples of Table I, the process involved temperatures between about 45°–50° C. in a first zone (feed), about 65°–70° C. in a second zone, about 105°–115° C. in a third zone, about 135°–145° C. in a fourth zone, about 130°–135° C. in a fifth zone, about 125°–130° C. in a sixth zone, and about 120°–125° C. in a seventh zone. A screw speed of about 205–210 rpm, a pressure of about 275–280 psi, and a feed rate of bout 60–75 $min^{-1}$, were employed. The melt temperature of the binder was about 120°–130° C.

During heating in the extruder, the temperature is sufficient to both melt the wax and disrupt the gel chains of the thermoplastic allowing it to become a flowable liquid and dissolve in the wax. This enables homogenous mixing with the ceramic blend raw materials. The homogenous paste is pushed through the die of the extruder into a spaghetti-like form. The spaghetti extrudates are thoroughly cooled at ambient temperature. Upon cooling, the gel which forms in the binder is reversible by application of heat, such heat being effective to break down the gel linkages formed in the binder on cooling. Thereafter, the extrudates are granulated to form a powder having a mean particle size of between 5 and 500 micrometers, preferably 25 to 250 micrometers which would allow for a high packing density of greater than 50% and preferably about 95%, during the plugging. The resulting sealant is a homogeneous mixture of the ceramic blend and the thermoplastic/wax binder system, and has a powder form.

The illustrative sealant samples of Table I were used to plug the ends of selected cell in honeycomb structures prepared in accordance with U.S. Pat Nos. 3,790,654, 3,919,384 and 5,258,150. A suitable plugging method is described and claimed in co-pending application filed concurrently with the present application in the names of by B. Allen, R. Foster, and W. Maclaren under the title METHOD FOR PLUGGING SELECTED CELLS IN A HONEYCOMB, which is incorporated by reference in its entirety herein. Accordingly, a first end face of the honeycomb structure is covered with a mask having openings corresponding to open ends of a first plurality of cell channels. Particulate sealant is loaded through the mask openings into the opened ends of the first plurality of cells. The sealant particulates flow to the end of cells opposite the first end face, to a desired depth. Plugs are formed thereat by first compacting the sealant particulates by suitable compaction means such as vibration, centrifuging, manual compaction and the like, and then heating the sealant to a temperature sufficient to achieve gel breakdown in the binder and form a flowable substance which fills and adheres to all four walls of the cells. Upon cooling, re-gelling occurs and the sealant resolidifies forming plugs at the cell ends. During experimental trials the heating was done at 120° C. for 15 minutes. In the samples tested it has been found that the sealant material must reach a temperature of at least about 100° C., for the particulates to begin fusing together, and fusion will continue until a temperature of about 160° C. where decomposition occurs.

The plugs created at the first end face are used as a mask to guide the formation of a second set of plugs at the opposing second end face. Therefore, sealing material is loaded into the ends of the open cells at the second end face and plugs are thereafter formed as described. The so-plugged honeycombs were sintered or fired at a temperature of about 1350° C. to 1450° C. for a period of time sufficient to form cordierite, as taught in U.S. Pat. No. 5,258,150. There is no plug deformation or distortation during the sintering step, because once the sealant at the honeycomb cell ends has cooled and re-gelled to form plugs, temperatures significantly higher than the plug forming temperature can be used to develop the cordierite structure in the plugs. Therefore, during firing because the gel breakdown temperature of the polymer gel exceeds the wax melting temperature, the plugs exhibit strong shape retention even at temperatures well above the melting and volatilization temperatures of the low-melting waxes.

Figure 2:
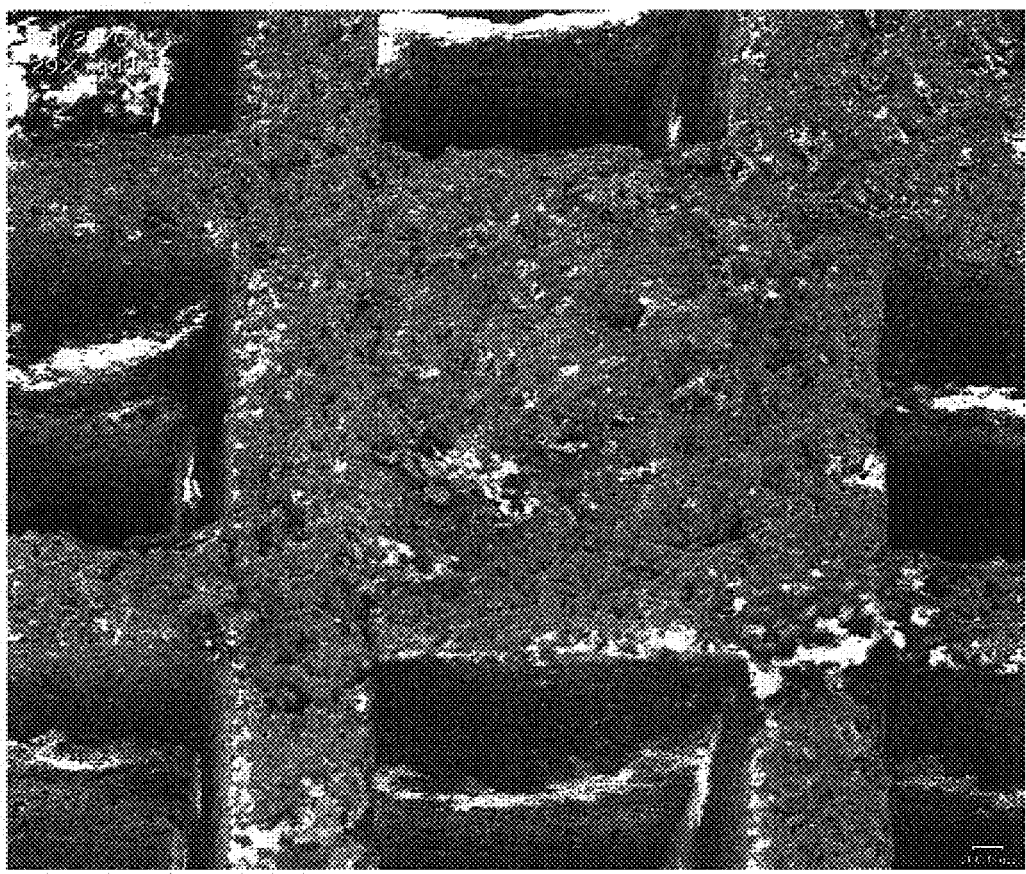

After sintering, the plugged honeycomb structures were inspected for cordierite formation in the plug material and plug integrity. The necessary cordierite phase was successfully developed in the plug and met internal specifications for diesel particulate filters. Plug integrity was inspected via standard scanning electron microscopy. FIG. 1 is a scanning electron micrograph (30x) taken of a honeycomb cell plugged with a cement-like paste, as known in the prior art. The plug exhibits good integrity by bonding to all four cell walls. FIG. 2 is a scanning electron micrograph (30x) taken of a honeycomb cell plugged with the inventive sealant material of Example 1. As can be observed, the plug made with sealant material according to the present invention similarly exhibits good integrity by bonding to all four cell walls and is virtually indistinguishable from the prior art material.

At the present time the most preferred combination of ceramic blend and binder for a sealant material appears to be about 85% by weight of the ceramic blend and about 15% by weight of the binder, wherein the binder consists essentially of in percent by weight about 9.8% fatty alcohol wax, about 4.9% tri-block styrene-ethylene/butylene-styrene copolymer, and about 1.7% dispersant, as illustrated in Example 1.

What is claimed:

1. A particulate sealant for forming plugs in selected cells of honeycomb structures and consisting essentially, by weight, of:

about 80 to 85% ceramic blend, the ceramic blend being raw ceramic materials selected to form a composition consisting essentially of in percent by weight about 12 to 16% MgO, about 33 to 38% $Al_2O_3$, and about 49 to 54% $SiO_2$, which will form cordierite ($2MgO.2Al_2O_3.5SiO_2$) on firing, and about 15 to 20% binder system comprising a thermoplastic polymer capable of forming a reversible gel or a thermosetting resin.

2. The particulate sealant according to claim 1 wherein the binder system comprises thermoplastic polymer capable of forming a reversible gel in combination with a low melting wax and a dispersant.

3. The particulate sealant according to claim 2 wherein the binder system has a formulation consisting essentially, by weight, of abut 5–20% low melting wax, 1–7% high molecular weight thermoplastic polymer, and 0–5% dispersant.

4. The particulate sealant according to claim 3 wherein the binder system has a formulation consisting essentially, by weight, of about 9.8–10.0% low melting wax, 4.9–5.0% high molecular weight thermoplastic, and 1.7% dispersant.

5. The particulate sealant according to claim 4 wherein the thermoplastic polymer is a tri-block styrene-ethylene/butylene-styrene copolymer, or a butyl methacrylate/acrylic acid copolymer.

6. The particulate sealant according to claim 5 wherein the low melting wax is selected from the group consisting of fatty alcohol, fatty acid, fatty glycol, and fatty glyceride waxes.

7. The particulate sealant according to claim 6 wherein the thermoplastic polymer is tri-block styrene-ethylene/butylene-styrene copolymer and the low melting wax is fatty alcohol.

8. The particulate sealant according to claim 6 wherein the thermoplastic polymer is butyl methacrylate/acrylic acid copolymer and the low melting wax is fatty alcohol.

9. The particulate sealant according to claim 1 wherein the binder system comprises a thermosetting resin.

10. The particulate sealant according to claim 9 wherein the thermosetting resin is selected from the group consisting of epoxy resins, phenolics, diallyl phthalates, unsaturated polyesters and functionalized acrylics.

11. The particulate sealant according to claim 10 wherein the thermosetting resin is epoxy resin.

12. The particulate sealant according to claim 11 wherein the epoxy resin is combined with a crosslinking agent, and a dispersant.

13. A material in powder form for sealing the end of selected cells of honeycomb structures and consisting essentially, by weight, of:

about 78 to 84% ceramic blend, the ceramic blend being raw ceramic materials selected to form a composition consisting essentially of in percent by weight about 12 to 16% MgO, about 33 to 38% $Al_2O_3$, and about 49 to 54% $SiO_2$, which will form cordierite ($2MgO.2Al_2O_3.5SiO_2$) on firing, and about 16 to 28% binder system, the binder consisting essentially, by weight, of about 9.5–15.0% low melting wax, about 5% thermoplastic polymer, and about 2 dispersant.

14. The material according to claim 13 wherein the low melting wax is selected from the group consisting of fatty alcohol, fatty acid, fatty glycol, and fatty glyceride waxes.

15. The particulate sealant according to claim 14 wherein the thermoplastic is tri-block styrene-ethylene/butylene-styrene copolymer and the low melting wax is fatty alcohol.

* * * * *